(12) United States Patent
Vo

(10) Patent No.: US 6,914,034 B2
(45) Date of Patent: Jul. 5, 2005

(54) ADSORBENTS FOR REMOVING HEAVY METALS AND METHODS FOR PRODUCING AND USING THE SAME

(75) Inventor: Toan Phan Vo, Niskayuna, NY (US)

(73) Assignee: Calgon Carbon Corporation, Pittsburgh, PA (US)

( * ) Notice: Subject to any disclaimer, the term of this patent is extended or adjusted under 35 U.S.C. 154(b) by 249 days.

(21) Appl. No.: 09/940,178

(22) Filed: Aug. 27, 2001

(65) Prior Publication Data

US 2004/0089608 A1 May 13, 2004

(51) Int. Cl.$^7$ ................................................. B01J 20/02
(52) U.S. Cl. ...................... 502/406; 502/414; 502/415; 502/428; 502/429; 502/437
(58) Field of Search ................................ 502/406, 414, 502/415, 428–429, 437

(56) References Cited

U.S. PATENT DOCUMENTS

| | | | | |
|---|---|---|---|---|
| 4,877,920 A | * | 10/1989 | Lush et al. | 585/823 |
| 5,114,592 A | | 5/1992 | Schuster et al. | |
| 5,378,366 A | | 1/1995 | Yen | |
| 5,432,077 A | * | 7/1995 | Farrah | 435/244 |
| 5,965,483 A | * | 10/1999 | Baker et al. | 502/425 |
| 6,475,386 B1 | * | 11/2002 | Carr et al. | 210/266 |
| 6,599,429 B1 | | 7/2003 | Azizian | |

OTHER PUBLICATIONS

B.E. Reed et al., "As(III), As(V) And Pb Removal by Fe–Oxide Imprengated Activated Carbon," J. Environ. Engl., 869 (Sep. 2000).

E. Bellack, "Arsenic Removal From Potable Water," 63 J. AWWA 454 (1971).

S.W. Hathaway and F.R. Rubel, Jr., "Removing Arsenic From Drinking Water," 79 J. AWWA 61 (Aug. 1987).

E. Diamadopoulos et al., "As(V) Removal From Aqeueous Solutions by Fly Ash," 27 Wat. Res. 1773 (1993).

M. Edwards, "Chemistry of Arsenic Removal During Coagulation and Fe–Mn Oxidation," J. AWWA 64 (Sep. 1994).

C.P. Huang and P.L.K. Fu, "Treatment of Arsenic (V)–Containing Water by the Activated Carbon Process," 56 J. WPCF 233 (1984).

C.P. Huang and L.M. Vane, "Enhancing As5+ Removal by a Fe2+–treated Activated Carbon," 61 J. WPCF 1596 (1989).

S.K. Gupta and K.Y. Chen, "Arsenic Removal by Adsorption," 50 J. WPCF 493 (1978).

US EPA, Office of Water, "Arsenic in Drinking Water," (Date unknown).

* cited by examiner

Primary Examiner—Chester T. Barry
(74) Attorney, Agent, or Firm—Christine W. Trebilcock, Esq.; Cohen & Grigsby, P.C.

(57) ABSTRACT

Adsorbents for removing anions of a heavy metals comprise a porous carbon in which at least one oxygen-containing compound of iron, copper, and/or aluminum is incorporated. The oxygen-containing compound may be incorporated into the porous carbon by impregnation or dispersion of a suitable precursor of such a compound. The precursor may be further treated to yield the oxygen-containing compound. Such adsorbents are particularly useful for removing arsenic and/or selenium from the environment and may be used in treating drinking water sources.

33 Claims, No Drawings

ADSORBENTS FOR REMOVING HEAVY METALS AND METHODS FOR PRODUCING AND USING THE SAME

FIELD OF INVENTION

The present invention relates to adsorbents for removing heavy metals from a medium adjacent thereto and methods for producing and using the same. In particular, the present invention relates to adsorbents for removing arsenic and/or selenium from a medium adjacent thereto and methods for producing and using the same.

BACKGROUND OF THE INVENTION

It has been known that many heavy metals, such as lead, arsenic, and selenium, are toxic to humans even at low levels. One cause for the presence of these heavy metals in the environment has been increasing industrial activities in the recent past. However, in some parts of the world, high levels of heavy metals, such as arsenic, exist naturally in underground water sources because of natural occurrence of these metals in rock formations. Recent epidemiological studies on the carcinogenicity of arsenic have triggered increasing concern about the concentration of arsenic in drinking water and have prompted reevaluation of the current United States maximum contaminant level ("MCL") of 50 $\mu$g/l for arsenic. Some recent studies on long-term human exposure show that arsenic in drinking water can be associated with liver, lung, kidney, and bladder cancer. Over exposure to selenium has been shown to have undesired effects on the nervous system and to contribute to the cause dyspnea, bronchitis, and gastrointestinal disturbance.

Many experimental techniques have been proposed or tested for removing arsenic. All of these techniques have achieved varying degrees of effectiveness when arsenic is first oxidized to As(V). Coagulation using alum or ferric sulfate has been shown to have an effect on arsenic levels at a near neutral pH in laboratory and pilot-plant tests. However, the efficiency of this process decreases sharply at low or high pHs. Moreover, the coagulant containing arsenic must be filtered, resulting in additional costs. Lime softening techniques have been shown to be effective at pH levels greater than about 10.5; and, therefore, is not likely to be applicable in drinking water applications. Adsorption treatment methods using activated alumina or ion exchange have been proposed and tested on a pilot-plant scale. However, adsorption of arsenic on alumina is seriously compromised when other ions are present, such as selenium, fluoride, chloride, and sulfate. The adsorption process using ion exchange adsorbents can remove arsenic, but sulfate, total dissolved solids ("TDS"), selenium, fluoride, and nitrate also compete with arsenic for the ion exchange capacity, thus decreasing likely effectiveness.

Therefore, there is a need to provide simple and convenient materials and methods for removing heavy metals such as arsenic and/or selenium from the environment that do not have the disadvantages of the prior-art materials and methods. It is also desirable to provide convenient materials and methods for removing arsenic and/or selenium from the environment, which materials and methods can be made widely available at low cost.

SUMMARY OF THE INVENTION

The present invention provides adsorbents and methods for removing heavy metals that exist as anions from the environment to acceptable levels. An adsorbent comprises a carbon adsorbent having at least one oxygen-containing compound incorporated therein wherein said oxygen-containing compound is of a metal selected from the group consisting of iron, copper, and aluminum. In one embodiment of the present invention, the oxygen-containing compound of a metal is selected from the group consisting of oxides and hydroxides. In another embodiment of the present invention, the oxygen-containing compound of a metal is incorporated into the carbon adsorbent by a method of impregnating or dispersing at least a compound of said metal in the carbon adsorbent.

Another embodiment of the present invention provides a method for producing a carbon adsorbent capable of removing heavy metals that exist as anions. The method comprises the steps of: (1) providing a carbon adsorbent; (2) impregnating the adsorbent with at least one compound of a metal selected from the group consisting of iron, copper, and aluminum or combinations thereof; and (3) converting said compound into at least one oxygen-containing compound. In another embodiment, the method comprises the steps of: (1) providing a carbonaceous material; (2) mixing at least one compound of a metal selected from the group consisting of iron, copper, and aluminum or combinations thereof into the carbonaceous material to produce a mixture of said carbonaceous material and said metal; (3) forming the mixture into particles of a carbonaceous material containing said metal; and (4) converting the particles of said carbonaceous material containing said metal into particles of a carbon adsorbent containing said metal.

Alternatively, a carbon adsorbent of the present invention for use in removing metal anions from a liquid or gas medium may be made by: (1) pulverizing a carbonaceous material, a binder, and at least one compound of a metal selected from the group consisting of iron, copper, and aluminum or combinations thereof to form a powdered mixture; (2) compacting said powdered mixture into shaped objects; and (3) crushing and screening the shaped objects into a metal-containing particulate material to produce said carbon adsorbent. Preferably, in step one, the carbonaceous material, binder and metal compound is pulverized together or, alternatively, the carbonaceous material, binder and metal compound are pulverized separately before making the pulverized mixture. Preferably in step two, the compacting is accomplished by briquetting, pelletizing, densifying or extruding processes. The method may also have an additional step four comprising gasifying said metal containing particulate material to produce said carbon absorbent. In an embodiment, the gasifying of step four is conducted under an atmosphere comprising an oxygen-containing gas at a temperature in a range from about 900° C. to about 1100° C. for a time sufficient to produce an adsorbent having a BET surface area of at least 100 m$^2$/g. The method may also comprise the additional step of oxidizing said metal-containing particulate material before the step of gasifying.

In another preferred embodiment of the present invention the method for removing heavy metals that exist as anions comprises the steps of: (1) providing a carbon adsorbent containing a metal selected from the group consisting of iron, copper, and aluminum; and (2) contacting said carbon adsorbent containing said metal with a medium containing the heavy metal anions. In all embodiments, the medium may be a liquid or gas phase in which the metals exist as anions. Preferably, the medium is drinking water.

Other features and advantages of the present invention will be apparent from a perusal of the following detailed description of the invention.

DETAILED DESCRIPTION OF THE INVENTION

The present invention provides an adsorbent for removing heavy metal from a medium that comprises a carbon having at least one oxygen-containing compound of a metal incorporated therein, wherein said metal is selected from the group consisting of iron, copper, and aluminum. Some heavy metals such as arsenic and selenium normally exist in the environment as anions and, thus, are soluble in water and difficult to be removed therefrom. One theory why conventional adsorption methods of water treatment using conventional solid adsorbents (such as activated carbon or alumina) are not very effective is because the adsorbents typically develop negative charges on their surfaces when immersed in water. Therefore, their surfaces tend to repulse the heavy metals anions, leading to low adsorption capacities for these anions. The present invention provides carbon adsorbents that overcome this shortcoming of traditional carbon adsorbents by incorporating at least an oxygen-containing compound of a metal selected from the group consisting of iron, copper, and aluminum into a porous carbon. It is contemplated that these and similar metals having metal oxides or hydroxides which are stable in liquid phase would work in the present invention. The carbon adsorbents of the present invention retain a substantial amount of their microporosity enabling them to remove heavy metal anions such as arsenic and selenium anions as well as organic materials from the surrounding medium such as liquid or gas. In a preferred embodiment, the medium is drinking water.

A metal-containing carbon adsorbent of the present invention is preferably a microporous carbon adsorbent, which has a large surface area as measured by the Brunauer-Emmett-Teller ("BET") method and has a substantial micropore volume for pores having diameter less than about 2 nm. As used herein, "micropore volume" is the total volume of pores having diameter less than 2 nm. Suitable carbon adsorbents for use in the present invention are those having a BET surface area greater than about 100 $m^2/g$, preferably greater than about 200 $m^2/g$, more preferably greater than about 400 $m^2/g$, and most preferably greater than about 600 $m^2/g$. In general, it is contemplated that the higher surface areas will capture metal anions and other contaminants, especially organics. These carbon adsorbents typically have a micropore volume greater than about 20 $cm^3/100$ g. Preferably, the carbon adsorbents have a micropore volume greater than about 30 $cm^3/100$ g, more preferably greater than about 40 $cm^3/100$ g, and most preferably greater than about 50 $cm^3/100$ g.

Suitable carbon adsorbents for use in the present invention may be made from any of a variety of starting carbonaceous materials such as, but not limited to, coals of various ranks such as anthracite, semianthracite, bituminous, subbituminous, brown coals, or lignites; nutshell; wood; vegetables such as rice hull or straw; residues or by-products from petroleum processing; and natural or synthetic polymeric materials. The carbonaceous material may be processed into carbon adsorbents by any conventional thermal or chemical method known in the art before incorporating the metal therein. They will inherently impart different surface areas and pore volumes. Generally, for example, lignites can result in carbon having surface areas about 500–600 $m^2/g$ and, typically, fiber-based carbons areas are about 1200–1400 $m^2/g$. Certain wood-based carbons may have areas in the range of about 200 $m^2/g$, but tend to have a very large pore volume which is generally suitable for depositing large amounts of impregnates. Surface area and pore volume of coal based carbon may also be made to allow for some control of surface area and pore volumes. Preferably, the carbon is an activated carbon adsorbent. Alternatively, at least one metal may be incorporated into the carbonaceous starting material, then the mixture may be processed into carbon adsorbents containing one or more of such metals.

In an embodiment, the carbon adsorbent contains metal at a concentration of up to about 50% by weight of the carbon. Preferably, the metal is present at a concentration in the range from about 1% to about 40% or, more preferably, from about 2% to about 30% and, more preferably, from about 3% to about 20% by weight of the carbon.

In another embodiment of the present invention, a microporous carbon adsorbent is impregnated with at least one salt of a metal selected from the group consisting of iron, copper, and aluminum. Examples of such salts include halides, nitrates, sulfates, chlorates, carboxylates having from one to five carbon atoms such as formates, acetates, oxalates, malonates, succinates, or glutarates of iron, copper, or aluminum. The impregnated salts are then converted to oxygen-containing compounds of iron, copper, or aluminum by either thermal decomposition or chemical reaction. Preferred forms of the oxygen-containing compounds are hydroxides and oxides.

The following examples illustrate preferred embodiments of the present invention.

EXAMPLE 1

Preparation of an Iron-Impregnated Carbon Adsorbent 4.6 ml of an aqueous ferric chloride solution (having a concentration of 100 g ferric chloride in 40 ml water) was diluted with 40.3 g of deionized water. This solution was poured slowly into 50.0 g of oven-dried 12×30 mesh (U.S. sieve series) coconut shell-based PCB™ activated carbon (Calgon Carbon Corporation, Pittsburgh, Pa.) contained in a pyrex glass dish. PCB™ activated carbon has a BET surface area of about 1050 $m^2/g$ and a micropore volume of about 60 $cm^3/100$ g. The impregnated carbon was stirred thoroughly while the solution was being poured into the carbon. The wet impregnated carbon was dried in an oven at 105° C. for 2 hours based on the amount of ferric chloride solution used for the impregnation. The dried impregnated carbon had an iron content of about 7.9% by weight of the carbon. The dried impregnated carbon was taken out of the oven and cooled down in a hood. A KOH solution was prepared by dissolving 12.47 g of KOH pellets in 60.02 g deionized water. The KOH solution was poured into the dried impregnated carbon. This amount of KOH was enough to completely wet the impregnated carbon without leaving an excess solution. The wet KOH-treated carbon was transferred into a 2000-ml beaker and the beaker was filled with deionized water. The water from the beaker was decanted and fresh deionized was added to wash potassium chloride from the impregnated carbon. This process of washing was repeated until the pH of the solution was about 7, as indicated by pH paper. The wet carbon was then dried in an oven at 105° C. overnight. It was expected that the iron in the carbon would be in the form of ferric hydroxide. The dried ferric hydroxide-impregnated carbon was pulverized in a titanium vial containing tungsten abrading balls for testing of the removal of heavy metal anions. This impregnated carbon was identified as "3224-31-1."

Testing of Arsenic Removal

An aqueous arsenic solution having an arsenic concentration of about 100 parts per billion ("ppb") by weight was prepared for testing by diluting into deionized water an appropriate amount of an arsenic standard solution of arsenic trioxide in 10% (by weight) nitric acid.

Polyethylene bottles having a nominal volume of 500 ml and magnetic stirring bars were cleaned with dilute nitric acid solution and dried. An appropriate amount of the pulverized impregnated carbon adsorbent 3224-31-1, as disclosed above, was put into a cleaned and dried polyethylene bottle containing a magnetic stirring bar. An amount of about 500 g of the arsenic solution prepared as disclosed above was put into the bottle. The bottle was then put on a multi-position stirring plate and the stirring continued for about 24 hours. At the end of the 24-hour period, a sample of the solution in the bottle was taken and filtered. The residual concentration of arsenic in the solution was analyzed by ICP/MS method. Many such bottles were prepared during the same experiment, each had a different amount of pulverized carbon adsorbent. In addition, a control bottle was also prepared in which no carbon adsorbent was added. The results of this testing are shown in Table 1A below. The limit of detection for this method of analysis was 0.3 ppb. This carbon could reduce the level of arsenic to less than detection limit with a small dose of the carbon.

TABLE 1A

| Bottle Number | Amount of Carbon Adsorbent (g) | Residual As Concentration (ppb) | pH (measured with pH meter) |
| --- | --- | --- | --- |
| 3208-17B | 0 | 83.8 | 4 |
| 3208-17F | 0.0249 | 19.8 | 4 |
| 3208-17G | 0.0496 | 1.25 | 4.1 |
| 3208-17A | 0.0998 | <0.3 | 4.2 |

Testing of this carbon was conducted with another aqueous arsenic solution having a targeted concentration of about 300 ppb similarly prepared. The results are shown in Table 1B.

TABLE 1B

| Bottle Number | Amount of Carbon Adsorbent (g) | Residual As Concentration (ppb) | pH (measured with pH meter) |
| --- | --- | --- | --- |
| 3208-37A-6 | 0 | 331 | 3.4 |
| 3208-37A-2 | 0.05 | 171 | 3.4 |
| 3208-37A-3 | 0.10 | 54.4 | No data |
| 3208-37A-4 | 0.20 | 5.5 | No data |

Although a coconut shell-based carbon was used in this example it is understood that other activated carbons may be equally applicable for the present invention. An economically attractive carbon for the present invention is one made from bituminous coal in a steam gasification process. For example, activated carbons suitable for the present invention may be those made from wood chips in a chemical activation process employing phosphoric acid, or those made from phosphoric acid treatment of petroleum residue, or activated carbons made from gasification of carbonized polymeric materials, such as those derived from phenolic resins or polyesters. Activated carbons suitable for the present invention may have the form of powder, granule, sphere, pellet, honeycomb, woven or nonwoven fiber, mat, or felt.

EXAMPLE 2

The same oven-dried PCB™ carbon was impregnated with ferric chloride to achieve a ferric ion loading of about 15.8% by weight of the carbon using the same manufacturing method as in Example 1. An arsenic solution having a targeted concentration of about 1 part per million ("ppm") was prepared from the arsenic trioxide standard solution as above. The results of this experiment are shown in Table 2. This carbon could remove a very high level of arsenic (841 ppb) to less than detection limit with only a small dose of the carbon.

TABLE 2

| Bottle Number | Amount of Carbon Adsorbent (g) | Residual As Concentration (ppb) | pH (measured with pH meter) |
| --- | --- | --- | --- |
| 3246-18M | 0 | 841 | 6.4 |
| 3246-18O | 0.50 | <0.3 | 6.3 |
| 3246-18Q | 2.50 | <0.3 | No data |

EXAMPLE 3

Preparation of Iron (II) Impregnated Carbon Adsorbent

An iron (II) impregnated activated carbon was prepared similarly to the process disclosed in Example 1, except a ferrous chloride solution was prepared for impregnation, instead of ferric chloride. 1.778 g of $FeCl_2 \cdot 4H_2O$ was dissolved into 40.0 g of deionized water. The ferrous chloride solution was impregnated into 50.0 g of oven-dried 12×30 mesh PCB™ activated carbon. The dried impregnated carbon had a nominal iron (II) loading of about 1% by weight. The dried impregnated carbon was reacted with a KOH solution consisting essentially of 1.27 g of KOH pellet dissolved in 70.16 g of deionized water. The washed and dried impregnated carbon was pulverized as above and labeled as "3224-32-1" for testing.

Testing for Arsenic Removal

The arsenic solution and the method of testing were similar to those disclosed in Example 1. The results of the testing are shown in Table 3.

TABLE 3

| Bottle Number | Amount of Carbon Adsorbent (g) | Residual As Concentration (ppb) | pH (measured with a pH meter) |
| --- | --- | --- | --- |
| 3208-18F | 0 | 348 | 3.4 |
| 3208-18A | 0.0253 | 307 | No data |
| 3208-18B | 0.0500 | 279 | No data |
| 3208-18C | 0.1001 | 211 | 3.4 |
| 3208-18D | 0.2000 | 116 | No data |
| 3208-18E | 0.5002 | 8.2 | 3.8 |

EXAMPLE 4

Oven-dried 12×30 PCB™ activated carbon was impregnated with aluminum chloride in the same manner as disclosed in Example 1. The aluminum chloride solution was prepared by dissolving 89.48 g of $AlCl_3 \cdot 6H_2O$ in 80.0 g of deionized water. The solution was impregnated into 100 g of oven-dried 12×30 PCB™ activated carbon. Thus, the impregnated carbon has an aluminum loading of about 10% by weight of the carbon. The aluminum chloride-impregnated carbon was reacted with a solution containing 63.17 g KOH in 120 g deionized water. The steps of washing, drying, and pulverizing were the same as those of Example 1. An arsenic solution having a targeted As concentration of about 1 ppm was prepared for testing. The arsenic removal testing was the same as that disclosed in Example 1 except different amounts of impregnated carbon were used. The results are shown in Table 4.

TABLE 4

| Bottle Number | Amount of Carbon Adsorbent (g) | Residual As Concentration (ppb) | pH (measured with pH meter) |
|---|---|---|---|
| 3246-18A | 0 | 851 | 5.6 |
| 3246-18C | 0.51 | 333 | 7.6 |
| 3246-18E | 2.50 | 4.84 | No data |
| 3246-18F | 5.00 | 4.19 | No data |

EXAMPLE 5

Preparation of Carbon Adsorbent Containing Ferric Oxide 3.7325 g of $Fe(NO_3)_3 \cdot 9H_2O$ was dissolved into 37.70 g of deionized water. This solution was poured over a 50.02 g of oven dried 12×30 mesh PCB™ carbon in a glass dish. The impregnated carbon was mixed thoroughly and then dried in an oven at 105° C. for 3 hours. The dried impregnated carbon was charged into a quartz tube having an inner diameter of about 2.54 cm. The carbon was retained in place by a piece of glass wool at each end. The quartz tube was inserted in a horizontal tube furnace and heated from ambient temperature to about 300° C. in 30 minutes, then held at that temperature for about 20 hours. The temperature was subsequently increased to 500° C. in about 20 minutes and held for an additional 3 hours. The heating was conducted under a flow of nitrogen at substantially ambient pressure at about 300 cm³/minute. The tube with the carbon still inside was cooled down under nitrogen flow to ambient temperature. It was expected that ferric nitrate decomposed to ferric oxide under this treatment condition. A representative sample of the ferric oxide-loaded carbon was pulverized as described in Example 1 above for testing. The results of the testing are shown in Table 5. The results show that arsenic was removed even at low doses of carbon.

TABLE 5

| Bottle Number | Amount of Carbon Adsorbent (g) | Residual As Concentration (ppb) | pH (measured with pH meter) |
|---|---|---|---|
| 3208-19F | 0 | 326 | No data |
| 3208-19A | 0.010 | 317 | No data |
| 3208-19B | 0.026 | 299 | No data |
| 3208-19C | 0.050 | 271 | No data |
| 3208-19D | 0.100 | 222 | No data |
| 3208-19E | 0.200 | 131 | No data |

EXAMPLE 6

Preparation of Carbon Adsorbent Containing Iron (III)

Meadow River bituminous coal (a bituminous coal from West Virginia, U.S.A.) was pulverized with 4% (by weight of the coal) coal tar pitch and 10% (by weight of the coal) $Fe_3O_4$ powder so that at least 90% of the pulverized material passed through 325 mesh screen (U.S. sieve series). Alternatively, the coal, pitch binder, and the iron powder may be pulverized separately and then mixed together after pulverization. The powder mixture was compacted in a Fitzpatrick roll press at about 1.5 MPa into elongated briquettes of about 1 cm wide, about 0.5 cm thick, and about 3–4 cm long. Other briquette shapes and sizes also may be used. The mixture also may be extruded into pellets instead of the above pressing to briquettes. The compaction pressure may be appropriately chosen for the particular coal used. It may be higher or lower than the pressure disclosed above, but typically is in the range from about 8 MPa to about 16 MPa. The briquettes were crushed and screened to produced particles having a mesh size of about 6×14. The produced particles were oxidized under an excess flow of air in an indirectly heated rotary kiln, the temperature of which was increased from ambient to about 250° C. at a rate of 45° C. per hour, and then from 250° C. to about 450° C. at a rate of 60° C. per hour. Other oxidizing gases also may be used, such as a mixture of oxygen and air or an inert gas, which mixture has an oxygen concentration greater than about 21% by volume, or a combustion product from a combustor containing oxygen, steam, and other gases. The resulting oxidized iron-containing coal particulate material was gasified in steam at 925–950° C. for about 40–45 minutes to produce an iron-containing porous carbon adsorbent of the present invention. The step of gasifying the carbon precursor, such as this coal particulate, in an oxidizing atmosphere is usually termed "activation." It should be understood that the activation temperature and time are chosen to be appropriate for the type of coal, the compaction technique, the type of activation furnace used in the process of manufacture, and the desired microporosity of the activated product. Generally, higher-rank coals and higher compaction would require a higher temperature and/or a longer time. A longer activation time produces a more porous activated carbon. Activation furnace types that provide a very intimate contact between the solid and the gas phase and a well-mixed solid therein usually require a shorter activation time. Activation temperature is typically in the range from about 900° C. to about 1100° C., and activation time is typically in the range from about 10 minutes to about 10 hours. In addition to steam, other oxygen-containing gases may also be present. The steps of oxidizing the coal particles and of gasifying the oxidized coal particles were carried out in this example in a rotary kiln. However, other types of furnaces or kilns may also be used in which an intimate contact between the solid and the gas phase can be maintained. Suitable furnaces or kilns are fluidized-bed kilns, belt furnaces, and Herreshoff furnaces. A representative sample of this adsorbent was pulverized in titanium vials using tungsten balls as disclosed above for testing.

Testing for Arsenic Removal

An arsenic solution was prepared similarly to that of Example 1, except the targeted As concentration was 1 ppm. The testing procedure was similar to that described in Example 1. The results of the testing are shown in Table 6.

TABLE 6

| Bottle Number | Amount of Carbon Adsorbent (g) | Residual As Concentration (ppb) | pH (measured with pH meter) |
|---|---|---|---|
| 3246-18G | 0 | 837 | 5.9 |
| 3246-18I | 0.5 | 685 | 6.4 |
| 3246-18K | 2.5 | 20 | No data |
| 3246-18L | 5.0 | 21.7 | No data |

EXAMPLE 7

Testing for Selenium Removal

The carbon of Example 1 was tested for selenium removal. A solution containing selenium was prepared as follows.

An aqueous selenium solution having a selenium concentration of about 300 parts per billion by weight was prepared for testing by diluting into Milli-Q water an appropriate amount of a 1000 ppm selenium standard reference solution. The reference solution was purchased from Fisher Scientific and is commonly used as the standard solution for atomic absorption spectroscopy.

The method of testing was similar to that described in Example 1. The results of the testing are shown in Table 7.

TABLE 7

| Bottle Number | Amount of Carbon Adsorbent (g) | Residual Se Concentration (ppb) | pH (measured with pH meter) |
|---|---|---|---|
| Control 1 | 0 | 273 | No data |
| 3224-31-1B | 0.10 | 39.3 | 6.1 |
| 3224-31-1C | 0.25 | 15.5 | 6.2 |
| 3224-31-1D | 0.50 | 9.7 | 6.4 |
| 3224-31-1E | 1.00 | 8.1 | 6.6 |

EXAMPLE 8

Testing for Selenium Removal

The carbon of Example 5 was tested for selenium removal. The solution containing selenium was prepared as described in Example 7.

The method of testing was similar to that described in Example 1. The results of the testing are shown in Table 8.

TABLE 8

| Bottle Number | Amount of Carbon Adsorbent (g) | Residual Se Concentration (ppb) | pH (measured with pH meter) |
|---|---|---|---|
| Control 3 | 0 | 289 | No data |
| 3129-28F-2 | 0.10 | 15.6 | 6.1 |
| 3129-28F-3 | 0.25 | 6.2 | 6.2 |
| 3129-28F-4 | 0.50 | 6.2 | 6.4 |
| 3129-28F-5 | 1.01 | 3.3 | 6.6 |

EXAMPLE 9

Testing for Selenium Removal

The carbon of Example 4 was tested for selenium removal. A solution containing selenium was prepared to have a target selenium concentration of about 300 ppb by diluting a selenium atomic absorption standard solution containing 100 ppm selenium dioxide in water.

The method of testing was similar to that described in Example 1. The results of the testing are shown in Table 9.

TABLE 9

| Bottle Number | Amount of Carbon Adsorbent (g) | Residual Se Concentration (ppb) | pH (measured with pH meter) |
|---|---|---|---|
| Control 2 | 0 | 295 | No data |
| 3246-14B-2 | 0.11 | 23.7 | 6.2 |
| 3246-14B-3 | 0.26 | 4.7 | 6.2 |
| 3246-14B-4 | 0.50 | 2.2 | 6.3 |
| 3246-14B-5 | 1.00 | 1.1 | 6.4 |

The adsorbents of the present invention may be used to remove heavy metal anions from a medium adjacent thereto in many arrangements. Granular particles of the adsorbents of the present invention may be installed in a fixed bed or a fluidized bed. Granular adsorbents are particularly suitable to be packaged in small cartridges for installation at the point of use. An adsorbent in powder form may be injected into a stirred tank and then removed by filtration or settling. Adsorbents in fiber form may be inserted in a section of the water supply piping. Furthermore, in certain circumstances, it may be advantageous to include at least one other type of adsorbents in a treatment of the medium. Such other types of adsorbents are, for example, zeolites, ion exchange resins, silica gel, alumina, and unimpregnated activated carbons.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A carbon adsorbent for use in removing heavy metal anions from a liquid or gas medium comprising a porous carbon having a BET surface area greater than about 100 $m^2/g$ and having incorporated therein at least one oxygen-containing compound of at least one metal selected from the group consisting of iron (II) and aluminum, or combinations thereof, wherein said adsorbent is capable of interacting with said anions of said heavy metal to lower a concentration of said heavy metal in said liquid or gas.

2. The adsorbent according to claim 1, wherein said oxygen-containing compound of metal is incorporated into said porous carbon by impregnation or dispersion within said adsorbent.

3. The adsorbent according to claim 1, wherein said oxygen-containing compound of at least one metal is an oxide or hydroxide.

4. The adsorbent according to claim 1, wherein said heavy metal is selected from the group consisting of arsenic, selenium and combinations thereof.

5. The adsorbent according to claim 1, wherein said adsorbent has a micropore volume of greater than about 20 $cm^3/100$ g.

6. The adsorbent according to claim 1, wherein said at least one metal selected from the group consisting of iron (II) and aluminum, or combinations thereof are present at a concentration of up to about 50% by weight of said carbon.

7. An adsorbent for removing heavy metal anions from a liquid or gas medium surrounding said adsorbent, said adsorbent comprising a porous carbon having incorporated therein at least one oxygen-containing compound of at least one metal selected from the group consisting of iron (II) and aluminum or combinations thereof, wherein said metal is present at a concentration in the range from about 0.01 to about 50 percent by weight of said porous carbon; said oxygen-containing compound being selected from the group consisting of oxides, hydroxides and combinations thereof; and said adsorbent having a BET surface area greater than about 100 $m^2/g$, wherein said adsorbent is capable of interacting with said anions of said heavy metal to lower a concentration of said heavy metal in said liquid or gas.

8. A method for making a carbon adsorbent for use in removing heavy metal anions from a liquid or gas medium containing said heavy metal, said method comprising the steps of:

(1) providing a porous carbonaceous adsorbent;

(2) impregnating said porous carbonaceous adsorbent with a solution comprising at least one compound of at least one metal selected from the group consisting of iron (II) and aluminum or combinations thereof; and (3) converting said compound into an oxygen-containing compound of said metal to produce said carbon adsorbent;

wherein said adsorbent is capable of interacting with said anions of said heavy metal to lower a concentration of said heavy metal in said liquid or gas.

9. The method according to claim 8, wherein said porous carbonaceous adsorbent is an activated carbon.

10. The method according to claim 8, wherein said compound of said metal is selected from the group consisting of halides, nitrates, sulfates, chlorates, carboxylates having one to five carbon atoms.

11. The method according to claim 8, wherein said step of converting consists of thermal decomposition or chemical reaction.

12. The method according to claim 8, wherein said one metal is present at a concentration of up to about 50% by weight of said porous carbonaceous adsorbent.

13. The method according to claim 8, wherein said oxygen-containing compound is an oxide or hydroxide.

14. The method according to claim 9, wherein said activated carbon has a BET surface area greater than about 100 $m^2/g$ and is selected from the group consisting of coal, wood, nut shell, petroleum residue and vegetable-based activated carbons.

15. The method according to claim 9, wherein said activated carbon is selected from the group consisting of coal, wood, nut shell, petroleum residue, vegetable-based activated carbons and has a micropore volume greater than about 20 $cm^3/100$ g of adsorbent.

16. A method for making a carbon adsorbent for use in removing heavy metal anions from a liquid or gas medium, said method comprising the steps of:

(1) pulverizing a carbonaceous material, a binder, and at least one compound of a metal selected from the group consisting of iron (II) and aluminum or combinations thereof to form a powdered mixture;

(2) compacting said powdered mixture into shaped objects;

(3) crushing and screening the shaped objects into a metal-containing particulate material; and (4) gasifying said metal-containing particulate material to produce said carbon adsorbent;

wherein said adsorbent is capable of interacting with said anions of said heavy metal to lower a concentration of said heavy metal in said liquid or gas.

17. The method according to claim 16, wherein said carbonaceous material, said binder, and said at least one compound of said metal are pulverized together.

18. The method according to claim 16, wherein said carbonaceous material, said binder, and said at least one compound of said metal are pulverized separately before said pulverized mixture is made.

19. The method according to claim 16, wherein said compacting is selected from the group consisting of briquetting, pelletizing, densifying, and extruding.

20. The method according to claim 16, wherein said gasifying is conducted under an atmosphere comprising an oxygen-containing gas at a temperature in a range from about 900° C. to about 1100° C., for a time sufficient to produce an adsorbent having a BET surface area of at least 100 $m^2/g$.

21. The method according to claim 16 further comprising the step of oxidizing said metal-containing particulate material before the step of gasifying.

22. A carbon adsorbent for use in removing heavy metal anions from a liquid or gas medium comprising a porous carbon having a BET surface area greater than about 100 $m^2/g$ and having incorporated therein iron (III) hydroxide, wherein said adsorbent is capable of interacting with said anions of said heavy metal to lower a concentration of said heavy metal in said liquid or gas.

23. The adsorbent according to claim 22, wherein said anions comprise oxygen-containing species of said heavy metal.

24. The adsorbent according to claim 23, wherein said iron (III) hydroxide is incorporated into said porous carbon by impregnation or dispersion within said adsorbent.

25. The adsorbent according to claim 23, wherein said heavy metal is selected from the group consisting of arsenic, selenium, and combinations thereof.

26. The adsorbent according to claim 23, wherein said iron (III) is present at a concentration of up to about 50% by weight of said carbon.

27. A method for making a carbon adsorbent for use in removing heavy metal anions from a liquid or gas medium containing said heavy metal anions, said method comprising the steps of:

(1) providing a porous carbonaceous adsorbent;

(2) impregnating said porous carbonaceous adsorbent with a solution comprising at least one compound of iron (III); and (3) converting said compound into iron (III) hydroxide to produce said carbon adsorbent;

wherein said carbon adsorbent is capable of lowering a concentration of said heavy metal anions in said liquid or gas medium.

28. The method according to claim 27, wherein said at least one compound of said iron (III) is selected from the group consisting of halides, nitrates, sulfates, chlorates, carboxylates having one to five carbon atoms.

29. A method for making a carbon adsorbent for use in removing heavy metal anions from a liquid or gas medium, said method comprising the steps of:

(1) pulverizing a carbonaceous material, a binder, and at least one compound of iron (III) to form a powdered mixture;

(2) compacting said powdered mixture into shaped objects;

(3) crushing and screening the shaped objects into an iron (III)-containing particulate material; and (4) gasifying said iron (III)-containing particulate material to produce said carbon adsorbent;

wherein said carbon adsorbent is capable of lowering a concentration of said heavy metal anions in said liquid or gas medium.

30. The method according to claim 29, wherein said carbonaceous material, said binder, and said at least one compound of said iron (III) are pulverized separately before said mixture is made.

31. The method according to claim 29, wherein said gasifying is conducted under an atmosphere comprising an oxygen-containing gas at a temperature in a range from about 900° C. to about 1100° C., for a time sufficient to produce an adsorbent having a BET surface area of at least 100 $m^2/g$.

32. A carbon adsorbent for use in removing heavy metal anions from a liquid or gas medium comprising a porous carbon having a BET surface area greater than about 100 $m^2/g$ and having incorporated therein copper hydroxide, wherein said adsorbent is capable of interacting with said anions of said heavy metal to lower a concentration of said heavy metal in said liquid or gas.

33. The adsorbent according to claim 32, wherein said anions comprise oxygen-containing species of said heavy metal.

* * * * *